(12) United States Patent
Kim et al.

(10) Patent No.: US 9,904,906 B2
(45) Date of Patent: Feb. 27, 2018

(54) MOBILE TERMINAL AND DATA PROVISION METHOD THEREOF

(71) Applicant: Samsung Electronics Co., Ltd., Gyeonggi-do (KR)

(72) Inventors: Eunsun Kim, Seoul (KR); Hwayoung Song, Seoul (KR); Yujin Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 167 days.

(21) Appl. No.: 14/087,780

(22) Filed: Nov. 22, 2013

(65) Prior Publication Data
US 2014/0143265 A1   May 22, 2014

(30) Foreign Application Priority Data

Nov. 22, 2012   (KR) .................. 10-2012-0132767

(51) Int. Cl.
*G06Q 10/10* (2012.01)
*H04M 1/725* (2006.01)
(Continued)

(52) U.S. Cl.
CPC ....... *G06Q 10/107* (2013.01); *G06F 3/04817* (2013.01); *G06Q 50/01* (2013.01); *H04M 1/72552* (2013.01); *H04M 1/72555* (2013.01); *H04M 1/274516* (2013.01); *H04M 2250/64* (2013.01)

(58) Field of Classification Search
CPC ......... H04M 1/72552; H04M 1/72555; H04M 3/42382; G06F 17/30581; G06F 17/30896; G06F 17/30126; G06F 17/30265; G06F 17/30268; G06F 17/30274; G06F 17/3028; G06F 17/30554; G06F 17/30793; G06F 17/3082
USPC ............... 709/206, 204, 219, 217, 203, 238; 715/752, 753, 810, 702, 764, 838, 234, 715/736, 758, 760, 766, 777, 781, 784, 715/788, 790, 833, 835, 856, 860; 707/E17.014, E17.01, E17.019, E17.044,
(Continued)

(56) References Cited

U.S. PATENT DOCUMENTS 7,028,253 B1 *   4/2006   Lieberman et al. .......... 715/512
7,283,992 B2 *   10/2007   Liu .................... G06F 17/30017
(Continued)

FOREIGN PATENT DOCUMENTS

EP   1 197 879   4/2002
EP   2 354 976   8/2011

*Primary Examiner* — Jay Morrison
*Assistant Examiner* — Ken Hoang
(74) *Attorney, Agent, or Firm* — The Farrell Law Firm, P.C.

(57) ABSTRACT

A mobile terminal capable of transmitting and receiving messages and a data processing method thereof for retrieving data from a database and transmitting the data to a network in a message efficiently are provided. The method includes displaying at least one first message; extracting at least one first keyword from the first message; determining whether an attach request event occurs; searching, when the attach request event occurs, a database for a first data corresponding to the extracted at least one first keyword; displaying, according to a result of the search, at least one of the first data and a first icon representing the first data; and transmitting a second message including the first data.

17 Claims, 9 Drawing Sheets

(51) Int. Cl.
*G06Q 50/00* (2012.01)
*G06F 3/0481* (2013.01)
*H04M 1/2745* (2006.01)

(58) Field of Classification Search
USPC ......... 707/E17.046, E17.108, 614, 709, 722,
707/738, 748, 769, 779, 802, 812, 822
See application file for complete search history.

(56) References Cited

U.S. PATENT DOCUMENTS

| | | | |
|---|---|---|---|
| 8,005,826 B1* | 8/2011 | Sahami | G06F 17/30023 707/723 |
| 2004/0199500 A1* | 10/2004 | Masuda et al. | 707/3 |
| 2005/0160460 A1* | 7/2005 | Fujiwara | G06F 17/30672 725/52 |
| 2005/0228790 A1 | 10/2005 | Ronnewinkel et al. | |
| 2007/0271340 A1* | 11/2007 | Goodman et al. | 709/206 |
| 2008/0243791 A1* | 10/2008 | Suzuki | G06F 17/30637 |
| 2012/0158765 A1* | 6/2012 | Kumar et al. | 707/766 |
| 2012/0284659 A1 | 11/2012 | De Leon | |
| 2013/0138744 A1* | 5/2013 | Rajamanthiram et al. | 709/206 |

* cited by examiner

MOBILE TERMINAL AND DATA PROVISION METHOD THEREOF

PRIORITY

This application claims priority under 35 U.S.C. § 119(a) to a Korean patent application filed on November 22, 2012 in the Korean Intellectual Property Office and assigned Serial No. 10-2012-0132767, the entire content of which is hereby incorporated by reference.

BACKGROUND OF THE INVENTION

1. Field of the Invention

The present invention relates generally to a mobile terminal and data provision method thereof and, more particularly, to a mobile terminal and data processing method thereof for retrieving data from a database and transmitting the data to a network in a message.

2. Description of the Related Art

A mobile terminal is capable of transmitting and receiving messages to and from another terminal through a network. The messages may carry the data (e.g., an image) stored in the mobile terminal. For example, the mobile terminal may detect a user's selection of an 'attach' button. In response to the selection of the attach button, the mobile terminal presents buttons for capturing photos or video, selecting photos and/or video, sending voice message, sending contact, etc. The mobile terminal detects the selection of one of the buttons (e.g., a photo/video selection button). In response to selection of the photo/video selection button, the mobile terminal displays icons (e.g., thumbnail images) representing photos and videos. If the user selects one of the displayed icons, the mobile terminal attaches the photo or video corresponding to the selected icon to a message and sends the message to the network.

According to such a conventional data provision method, the user must laboriously search through a large amount of data in order to find and select a target data (e.g., data to be attached after selecting the attach button). Therefore, it takes a long time for a user to attach the target data.

SUMMARY OF THE INVENTION

Accordingly, the present invention has been made to solve the above-stated problems occurring in the prior art, and an aspect of the present invention provides a mobile terminal and data provision method thereof that is capable of facilitating retrieval of the data to be attached to a transmission message.

In accordance with an aspect of the present invention, a data provision method of a mobile terminal capable of transmitting and receiving messages is provided. The method includes displaying at least one first message; extracting at least one first keyword from the first message; determining whether an attach request event occurs; searching, when the attach request event occurs, a database for a first data corresponding to the extracted at least one first keyword; displaying, according to a result of the search, at least one of the first data and a first icon representing the first data; and transmitting a second message including the first data.

In accordance with another aspect of the present invention, a mobile terminal capable of transmitting and receiving messages is provided. The mobile terminal includes a radio communication unit which transmits and receives the messages; a display unit configured to display the messages; an input unit configured to receive input of a message; and a control unit configured to control the input unit, the display unit, and the radio communication unit, wherein the control unit extracts at least one first keyword from at least one first message displayed on the display unit, searches, when the attach request event occurs, a database for a first data corresponding to the extracted at least one first keyword, controls displaying, according to a result of the search, at least one of the first data and a first icon representing the first data, and controls transmission of a second message including the first data.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Herein, the term 'message' denotes the data exchanged between a user's mobile terminal and another terminal through a network. The message can be transmitted and received via Short Messaging Service (SMS), email service, Instant Messenger (IM), and Social Networking Service (SNS) applications (hereinafter, the abbreviation 'app' is used interchangeably with the term 'application'), for example. Such a message may support attachment of additional data as well as text. Additional data included in a message may include, for example, document, image, motion picture, music, sound, voice message, and website files having a certain extension; and information such as contact, memo, and schedule information in a non-file format. Unless otherwise noted, the messages are described with respect to a mobile terminal hereinafter. In the following description, the term 'transmission message' denotes a message transmitted from the mobile terminal to another terminal, the term 'reception message' denotes the message received by a mobile terminal from another terminal, and the term 'input message' denotes a message that a user has input to a mobile terminal before transmission, i.e., the input message is the message waiting to be sent.

According to embodiments of the present invention, the mobile terminal is the device capable of exchanging messages with other terminals through a network and may include a cellular phone, a smartphone, a tablet PC, a laptop PC, etc. Hereinafter, a data provision method of a mobile terminal according to an embodiment of the present invention is described in detail. Herein, detailed descriptions of well-known functions and structures incorporated herein may be omitted to avoid obscuring the subject matter of the present invention. The terms and words used in this description and the appended claims are not to be interpreted in common or lexical meaning but, the meanings of terms herein are defined in order to describe the invention, and are to be interpreted in the meaning and concept conforming to technical concepts of the present invention. Therefore, the embodiments described in the specification and the constructions illustrated in the drawings do not represent all of the technical spirit of the present invention. Accordingly, various equivalents and modifications may be used to substitute the described embodiments. In the drawings, certain elements may be exaggerated or omitted or schematically depicted for clarity.

Figure 1:
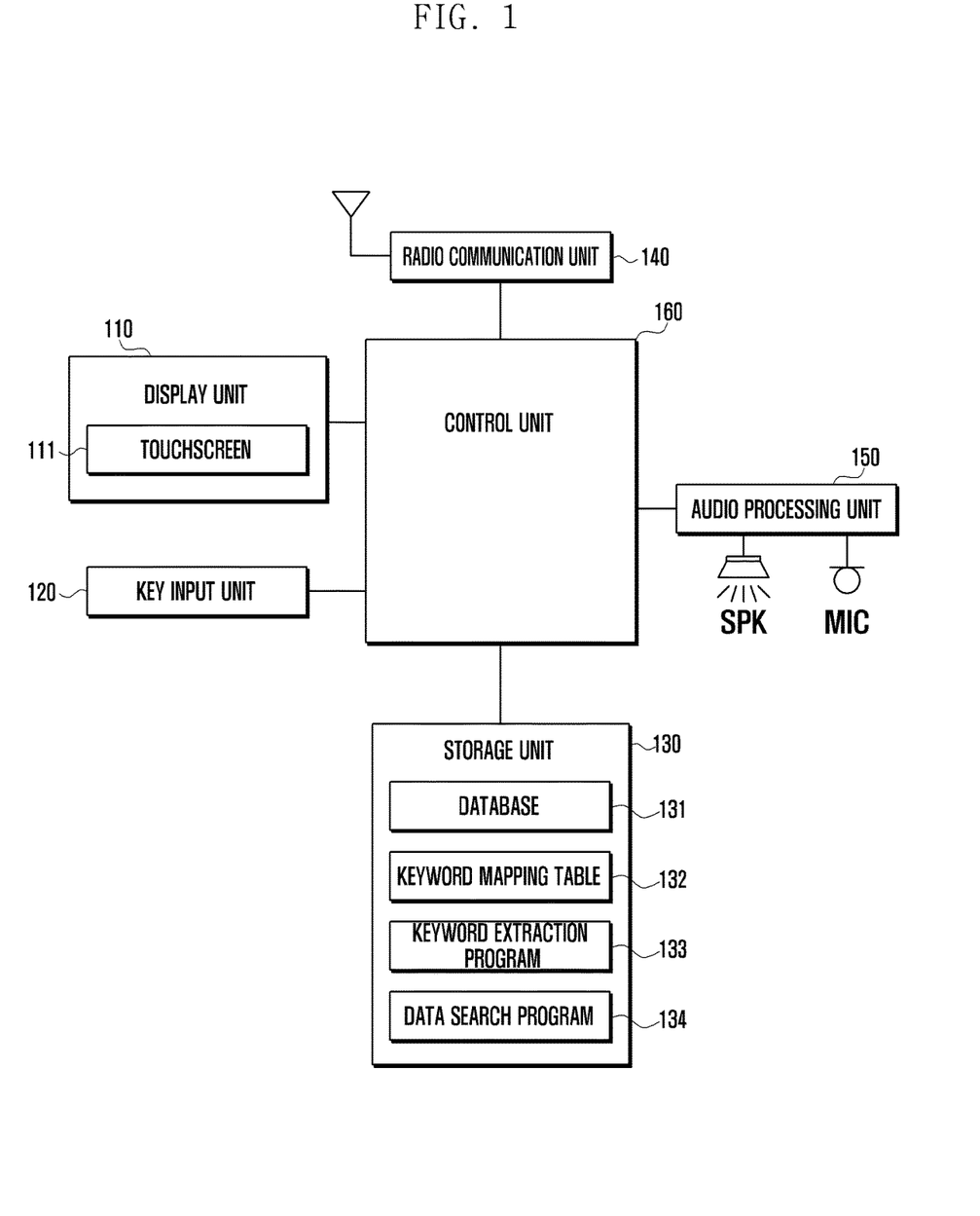
FIG. 1 is a block diagram illustrating the configuration of the mobile terminal according to an embodiment of the present invention.

FIG. 1 is a block diagram illustrating the configuration of a mobile terminal according to an embodiment of the present invention.

As shown in FIG. 1, a mobile terminal according to an embodiment of the present invention includes a display unit 110, a key input unit 120, a storage unit 130, a radio communication unit 140, an audio processing unit 150, a speaker SPK, a microphone MIC, and a control unit 160.

The display unit 110 displays data under the control of the control unit 160. The control unit 160 renders the data and stores the rendered dater in a buffer. The display unit 110 converts the buffered data to an analog signal to display the data. The display unit 110 is capable of displaying various screens of associated with the operations of the terminal 100, such as a lock screen, a home screen, an application execution screen, and a keypad. When the mobile terminal powers on, the display unit 110 displays the lock screen. If a touch input or key input for unlocking the mobile terminal is detected, the control unit changes the lock screen into the home screen or an application execution screen. The home screen may include a background image and a plurality of icons arranged thereon. Herein, the icons correspond to respective applications. If an icon is selected by the user (e.g., selected by a tap on the icon), the control unit executes an application corresponding to the selected icon (e.g., a Social Networking Service (SNS) application) and displays an execution screen of the application via the display unit 110. The display unit may display the application execution screen in the form of a background and another image (e.g., a keypad), on the foreground so as to be overlaid on the background. The display unit 110 displays a first image at a first display region and the second image at a second display region. The display unit may be implemented with any of a Liquid Crystal Display (LCD), an Organic Light Emitting Diode (OLED), Active Matrix OLED (AMOLED), and a flexible display, for example.

The touchscreen 111 is placed on the display unit 110. More specifically, the touchscreen 111 may be implemented as an add-on type touchscreen placed on a front surface of the display unit 110 or on-cell type or in-cell type touchscreen inserted within the display unit 110.

The touchscreen 111 generates an analog signal (e.g., a touch event) in response to a user gesture and converts the analog signal to a digital signal to be transferred to the control unit 160. Herein, the touch event includes touch coordinates (e.g., x, y co-ordinates). If the touch coordinates are received from the touchscreen 111, the control unit 160 determines that a touch tool (e.g., a finger or a pen) is in contact with the touchscreen 111 and, if no touch coordinate is received, that the touch has been released. If the coordinates are changed (e.g., from $(x_1, y_1)$ to $(x_2, y_2)$), the control unit 160 determines that the touch has moved. In response to the touch movement, the control unit calculates the displacement (dx, dy) and movement speed of the touch. The control unit 160 determines the user gesture is one of, for example, a touch, a double touch, a tap, a double tap, a long tap, a tap & touch, a drag, a flick, a press, a pinch-in, and a pinch-out, based on at least one of the touch coordinates, whether the touch is applied or released, whether the touch moves, touch displacement, and touch movement speed.

The 'touch' is a user's gesture placing a touch tool in contact with a position on the touchscreen 111. The 'multi-touch' is the gesture of placing the touch tool in contact with at least two positions (e.g., with a thumb and an index finger) on the touch screen 111. The 'tap' is the gesture placing a touch tool in contact with a position on the screen and releasing the contact (i.e., a touch-off) without moving the touch tool. The 'double tap' is a gesture of performing the tap twice. The 'long tap' is a gesture of maintaining the contact for a long time, as compared to the tap and subsequent release. The 'tap and touch' is a gesture of making a tap to a certain position and then making a touch at the same position within a predetermined time (e.g. 0.5 seconds). The 'drag' is a gesture of placing a touch tool in contact with a position and moving the contact on the screen in a certain direction. The 'flick' is a gesture of snapping on the screen quickly as compared to the drag gesture. The 'press' is a gesture of placing a touch tool in contact with a certain position on the screen and applying pressure. The 'pinch-in' is a gesture of making two contact points with two touch tools, and then narrowing the distance between the two contact points. The 'pinch-out' is a gesture of widening the distance between two contact points.

Herein, a 'touch' refers to a state of contacting the touchscreen 111. Meanwhile, other gestures are changes to a touch performed during a touched state. The touchscreen 111 may be provided with a pressure sensor to detect pressure at the touched position. The detected pressure information is sent to the control unit 160, such that the control unit 160 distinguishes between the touch and pressure, based on the pressure information.

The touch panel 111 can be implemented as a combined touch panel including a finger touch panel for detecting a gesture made by human body and a pen touch panel for detecting pen gesture made by a pen. Here, the finger touch panel can be implemented as a capacitive type panel. The finger touch panel is capable of detecting the touch gesture made by certain objects (e.g., e.g., conductive material capable of changing electrostatic capacity), as well as human body. The pen touch panel can be implemented with an electromagnetic induction type panel. In this case, the pen touch panel generates a touch event in response to the gesture made by a touch stylus pen manufactured to generate magnetic field.

The key input unit 120 is provided with a plurality of keys for receiving alphanumeric information and configuring various functions. The function keys may include menu keys, a screen on/off key, a power on/off key, a volume control key, etc. The key input unit 120 is capable of generating a key event output to the control unit 160 in association with user settings and function controls of the mobile terminal 100. The key events may include a power on/off event, a volume control event, a screen on/off event, etc. The control unit 160 controls the components in response to these key events. The keys of the key input unit 120 are referred to as hard keys, while the virtual keys provided on the touchscreen 110 are referred to as soft keys.

The storage unit 130 is a secondary memory unit implemented with any of a disc, Random Access Memory (RAM), Read Only Memory (ROM), and flash memory, for example. The storage unit 130 includes a database 131 and a keyword mapping table 132.

The database 131 stores data generated in the mobile terminal 100 and received from external devices (e.g., a server, a desktop Personal Computer (PC), and a tablet PC), through an external device interface (not shown). The database 131 also stores the property information on the data. The property information is information related to corresponding data and also may be referred to as tag information herein. For example, the property information includes information such as a reception time, transmission time, creation time, created location, data type (e.g. Joint Picture Experts Group (JPEG) and Motion Picture Experts Group (MPEG)), and information related to the data sender (e.g., a phone number, an email address, a residence address, and an office address).

The keyword mapping table 132 includes keywords extracted from the data and the property information. The keyword mapping table 132 also includes the map information corresponding to a relationship among the keywords. For example, the keywords can be classified by relationship as shown in Table 1.

TABLE 1

| Time | Location | Person |
|---|---|---|
| Summer, June | Switzerland, Zurich | Mom, Dad |
| Autumn, October | Korea, Seoul, Busan | Phone number, contact |

The storage unit 130 stores information such as a booting program, and Operating System (OS), a keyword extraction program 133, and a data search program 134. The keyword extraction program 133 includes a function of extracting the keywords corresponding to time, location, and people from the presented data (e.g., a message) and a function of extracting the keywords corresponding to the location, time, and people from the property information of the presented data. The keyword extraction program 133 further includes a natural language processing engine for recognizing and processing context of the data (e.g. text); a function for determining whether the message is a query message, request message, or response message to a query or request using the natural language processing engine; and a function extracting keywords from only the query, request, and response messages among the displayed messages. For example, if a message "please send me James' phone number" is received, this message is determined as a query message, such that the keyword extraction program extracts keywordsfrom the message corresponding to person (i.e. "James" and "phone number"). The keyword extraction program 133 further includes a function of selecting the message for extracting keywords among the displayed message based on the time. For example, the keyword extraction program 133 may extract the keyword from the input message among the displayed messages. The keyword extraction program 133 selects the most recent message from the reception messages and extracts keywords from the selected message. The keyword extraction program 133 selects the most recent message among the transmission messages and extracts keywords from the selected transmission message.

The data search program 134 includes functions of searching the database 131 for data corresponding to the keyword and controlling the display unit 110 to display the results of the search.

The storage unit 130 may also include a Speech-To-Text (STT) program to convert speech data to text.

The storage unit 130 is also capable of storing embedded applications and third party applications. Embedded applications are basic applications installed in the apparatus, such as a browser, email, instant messenger, etc. Third party applications are diverse applications that can be downloaded from an online market and installed in the terminal. Third party applications can be installed and uninstalled freely. When the mobile terminal powers on, the booting program is loaded on the main memory device (e.g. RAM) of the control unit 160. The booting program loads the OS of the mobile terminal onto a main memory device (not shown). The OS loads the keyword extraction program 133, the data search program 134, embedded applications (not shown), and the third party applications (not shown) onto the main memory device.

The radio communication unit 140 transmits/receives data for voice, video, and data communication through networks, under the control of the control unit 160. For this purpose, the radio communication unit 140 includes a transmitter and a receiver, such as an a Radio Frequency (RF) transmitter for up-converting and amplifying signals to be transmitted and an RF receiver for low noise amplifying and down-converting received signals. The radio communication unit 140 includes at least one of cellular communication module (e.g., a 3rd Generation (3G) cellular communication module, a 3.5G cellular communication module, a 4G cellular communication module, etc.), a digital broadcast module (e.g. a Digital Multimedia Broadcasting (DMB) module), and a short range communication module (e.g., a Wi-Fi module and a Near Field Communication (NFC) module).

The audio processing unit 150 is connected to the speaker SPK and the microphone MIC and processes input/output audio for supporting voice recognition, voice recording, digital recording, and telephony functions, for example. The audio processing unit 150 receives audio data output from the control unit 160, converts the output audio data to an analog signal, and outputs the analog signal through the speaker SPK. The audio processing unit 150 receives an analog signal input through the microphone, converts the analog signal to audio data, and transfers the audio data to the control unit 160. The speaker SPK converts the analog signal from the audio processing unit 150 to output an audible sound wave. The microphone MIC converts the voice and other sound waves to audio signals. The speaker (SPK) may include first and second speakers (now shown). The first speaker may be used for telephony purposes, (i.e., when the user holds the mobile terminal 100 to the ear for telephony communication). The second speaker may be used for playing data such as audio and video (in addition to telephony purposes), and may be designated as a loudspeaker.

The control unit 160 controls overall operations of the apparatus 100 and signal flows among the internal component of the apparatus and processes data. The control unit 160 may include a main memory device (not shown) for storing the OS and application programs, a cache memory (not shown) for storing data to be written into the storage unit 130 temporarily and read from the storage unit 130, a Central Processing Unit (CPU) (not shown), a Graphic Processing Unit (GPU) (not shown), etc. Here, the OS is responsible for providing interface between hardware and programs and manages computing resources such as CPU, GPU, main memory device, and auxiliary memory device. The OS operates the mobile terminal, schedules tasks, and controls operations of the CPU and GPU. The OS is also responsible for controlling program execution and data and file storage management. The CPU is the main control unit of a computer system that performs data operations and comparison and command interpretation and execution. The GPU is the graphic control unit of performing graphic-related data operation and comparison and command interpretation and execution. Each of CPU and GPU can be integrated into a package of a single integrated circuit including two or more independent cores (e.g. quad-core). The CPU and GPU are also can be integrated into a chip in the form of System on Chip (SoC). The CPU and GPU are also can be implemented in the form of multi-layered package. The packaged CPU and GPU may be referred to as Application Processor (AP).

The operations of the control unit 160 that are featured with respect to embodiments of the present invention (i.e. keyword extraction and data search) are described in detail herein with reference to accompanying drawings.

Although not enumerated herein, the mobile terminal 100 may further include other elements, such as a Global Positioning System (GPS) module, a vibration motor, a camera, accessories, an external device interface (e.g., an ear jack), etc. Herein, accessories include components of the mobile terminal 100 that are detachable, such as stylus pen for use in making a touch on the touchscreen. The mobile terminal 100 according to an embodiment of the present invention can be implemented with or without any of the aforementioned components depending on implementation of the mobile terminal 100.

Figure 2:
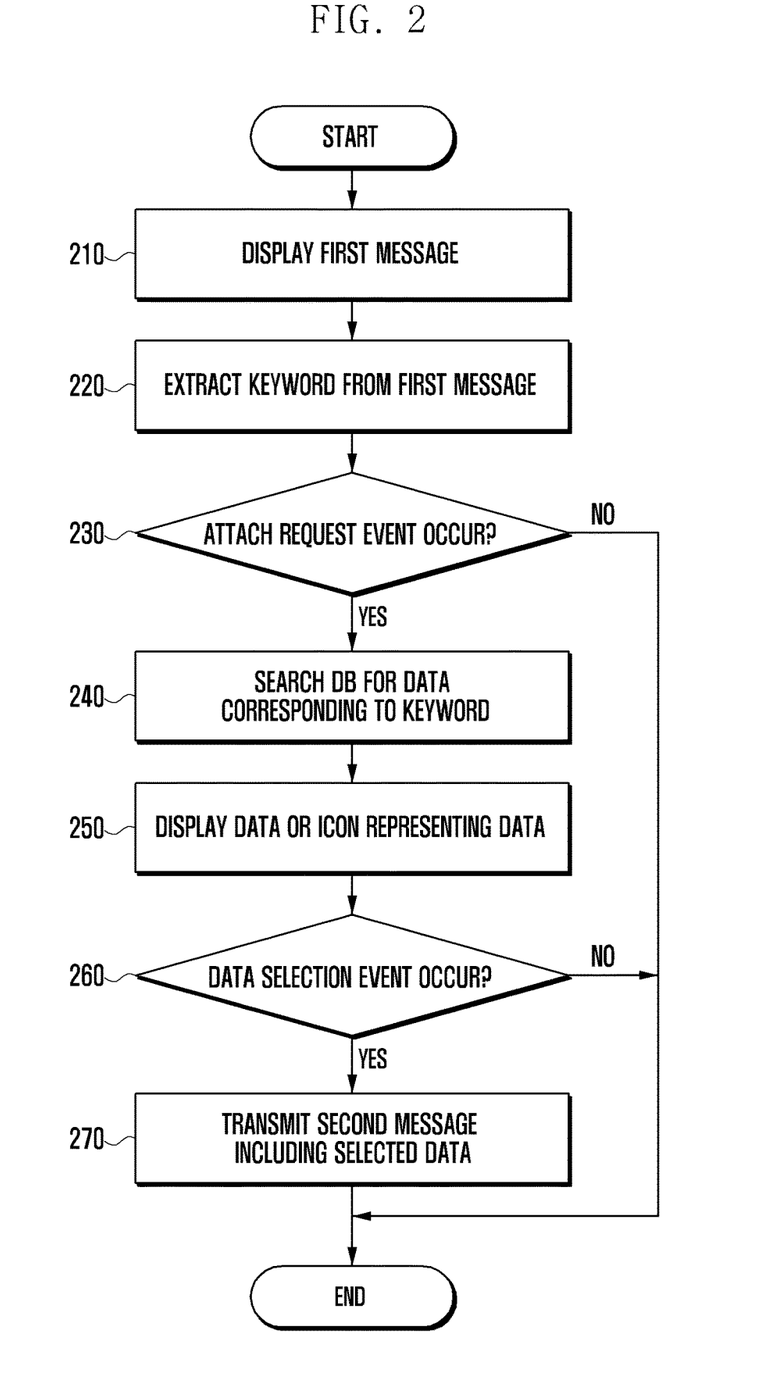
FIG. 2 is a flowchart illustrating the data provision method according to an embodiment of the present invention.

FIG. 2 is a flowchart illustrating a data provision method according to an embodiment of the present invention. FIGS. 3A to 3D are diagrams illustrating examples of screens displayed during performance of the data provision method of FIG. 2.

Figure 3A:
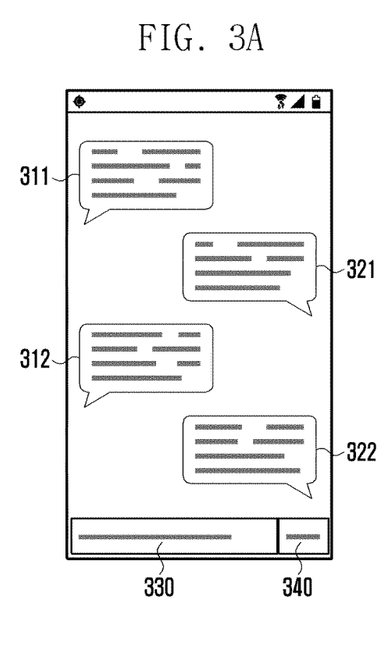
FIGS. 3A to 3D are diagrams illustrating examples of screens displayed in the procedure of the data provision method of FIG. 2.

Referring to FIGS. 1, 2, and 3A to 3D, the display unit 110 displays at least one first message under the control of the control unit 160 at step 210. As shown in FIG. 3A, the display unit 110 displays a plurality of reception messages 311 and 312, a plurality of transmission messages 321 and 322, and an input message 330. The control unit 160 may control the display unit 110 to display at least one reception message and at least one transmission message. The control unit 160 also may control the display unit 110 to display at least one transmission message. The control unit 160 also may control the display unit 110 to display the input message.

The display unit 110 displays the property information (e.g., a transmission time) along with the transmission message under the control of the control unit 160. When data is attached to the transmission message, the display unit 110 displays the attached data or an icon (e.g., a thumbnail image) representing the attached data. The display unit 110 displays the reception data and property information (e.g., a reception time and a sender name) of the reception data under the control of the control unit 160. When data is attached to the reception message, the display unit 110 displays the attached data or icon (e.g., a thumbnail image) representing the attached data.

Figure 3B:
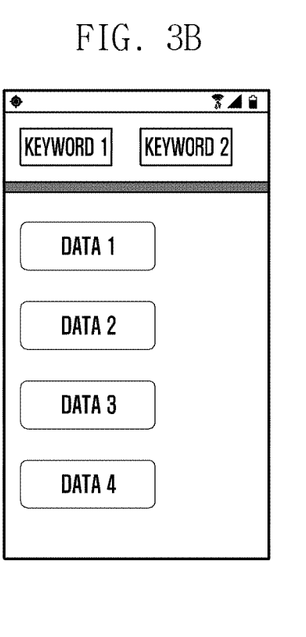
Figure 3C:
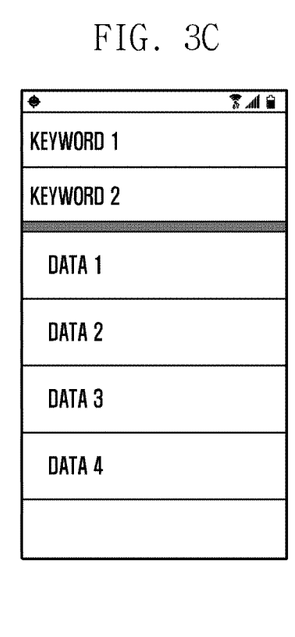

The display unit 110 displays the messages under the control of the control unit 160, such that the user distinguishes between the transmission messages and the reception messages intuitively. For example, the reception messages 311 and 312 are arranged at the left side of the screen and the transmission messages 321 and 322 are arranged at the right side of the screen, as shown in FIG. 3A. Accordingly, the user is capable of distinguishing between the transmission messages and the reception messages according to their position arranged on the screen. In addition to, or as an alternative, the messages may be formatted so as to be distinguished from each other according to the background color, font color, frame shape, etc. For example, the reception messages may be presented with a grey background while the transmission messages are presented with a green background. The reception messages may be presented with red font while the transmission messages are presented with black font. Although FIGS. 3A to 3C are directed to an example where the transmission and reception message frames are formed in a shape of bubble without distinction, it is possible that the messages frames may have different shapes (e.g., the reception messages may be presented in square frames while the transmission messages in circle frames).

The control unit 160 extracts keywords from the first message at step 220. More specifically, the control unit 160 extracts the keywords corresponding to the location, time, and people from the first message presented on the screen. The control unit 160 determines whether an attach request event occurs at step 230. If an attach request event occurs, the control unit searches the database 131 for data corresponding to the keywords, at step 240. Herein, the database is not limited to the database 131 of the mobile terminal 100. More specifically, the control unit may control the radio communication unit 140 to search an external device (e.g., a server) for the data. For example, the control unit 160 may control the radio communication unit 160 to transmit a search request message including the keywords to the server. In response to this request, the server searches the database for the data corresponding to the keywords and sends the response message including the found data to the mobile terminal 100. Meanwhile, the attach request event may be a user gesture (e.g., a tap on 'attach' button presented by the display unit 110) made on the touchscreen 111. The attach request event may be a key event occurring at the key input unit 120. The attach request event also may be a speech input, wherein the microphone MIC converts the user's speech to generate an audio signal and provide the audio signal to the audio processing unit 150 such that the audio processing unit 150 performs A/D conversion on the audio signal received through the microphone MIC to generate a digital signal and provide the digital signal to the control unit 160. The control unit 160 receives the speech data from the audio processing unit 150, converts the speech data to a text, and determines, if the text include a keyword (e.g., 'attach') indicating that the attach request event has occurred.

The control unit 160 controls the display unit 110 to display the found data or icon representing the data, at step 250. At this time, the control unit 160 may also control the display unit 110 to display the keyword. Accordingly, the user is informed of the keyword with which the displayed data are searched. Referring to FIGS. 3B and 3C, DATA 1 to DATA 3 are displayed in the form of corresponding icons. These icons may be presented in the form of thumbnail images, such as shown in FIG. 3B, or in a list format, as shown in FIG. 3C. In each of FIGS. 3B and 3C, KEYWORD 1 and KEYWORD 2 are also displayed. These keywords can be presented in the form of thumbnail images, as shown in FIG. 3B, or in a list format, as shown in FIG. 3C.

Figure 3D:
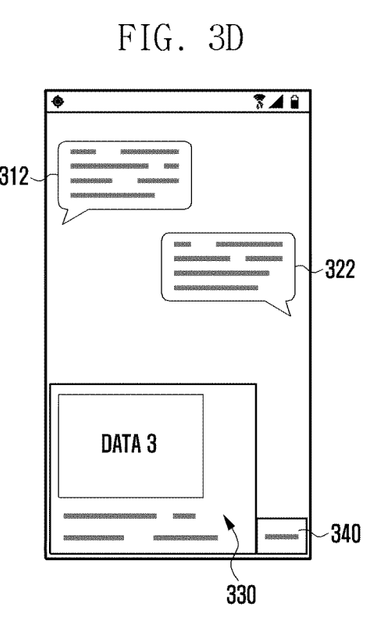

The control unit 160 determines whether an event for selecting a found data occurs, at step 260. If a data selection event occurs, the control unit controls the display unit 110 to display the input message 330 including the icon of the selected data, such as shown in FIG. 3D. Referring to FIG. 3D, if DATA 3 is selected, the input message 330 including the icon of DATA 3 is displayed. The data selection event may be a user gesture (e.g., tap on "DATA 3 " in FIG. 3B) made on the touchscreen 111. The selection event may be a key event occurring at the key input unit 120. The data selection event may be a speech input, i.e., the control unit 160 may receive the speech data from the audio processing unit 150, convert the speech data to a text, and determine, if the text includes a keyword (e.g., 'DATA 3') indicating that the selection event for selecting 'DATA 3' has occurred.

If a transmission request event occurs, the control unit 160 controls the radio communication unit 140 to transmit the second message including the selected data (i.e., the input message), at step 270. The transmission request event may be a user gesture (e.g., a tap on 'send' button 340 in FIG. 3d) made on the touchscreen 111. The transmission request event also may be a key event occurring at the key input unit 120. The transmission request event also may be a speech input, i.e., the control unit 160 may receive speech data from the audio processing unit 150, convert the speech data to a text, and determine, if the text includes a keyword (e.g. 'send'), that the selection event for selecting 'DATA 3' has occurred.

Figure 4:
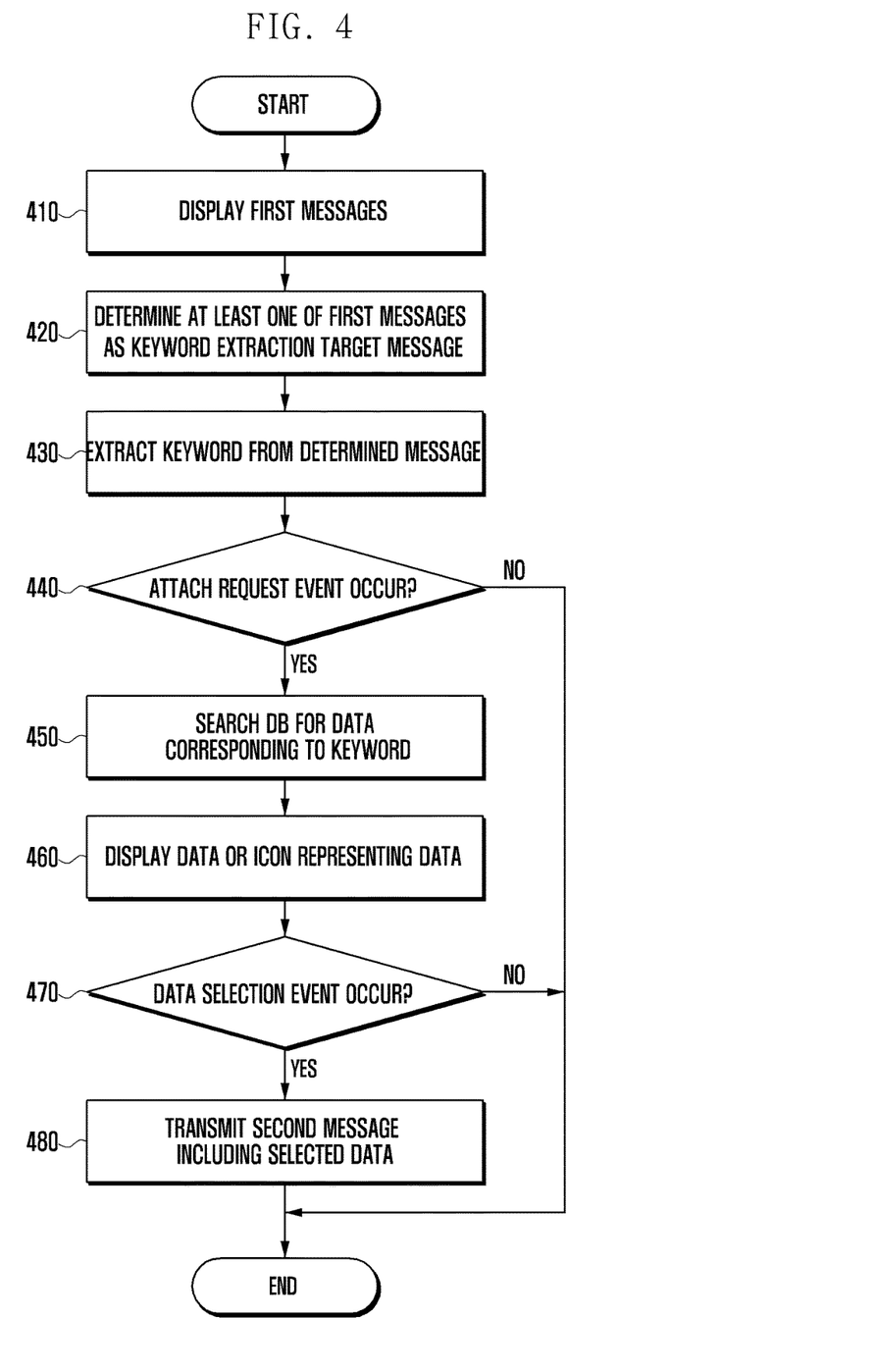
FIG. 4 is a flowchart illustrating the data provision method according to another embodiment of the present invention.

FIG. 4 is a flowchart illustrating a data provision method according to another embodiment of the present invention.

Referring to FIGS. 1 and 4, the display unit 110 displays first messages under the control of the control unit 160 at step 410. The first messages include, for example, any of:
- an input message and at least one reception message;
- an input message and at least one transmission message;
- an input message, at least one reception message, and at least one transmission message;
- at least one reception message and at least one transmission message;
- at least two reception messages; or
- at least two transmission message.

The control unit determines at least one of the first messages as a keyword extraction target message, at step 420.

For example, the control unit 160 may determine the most recently received reception message from among the reception messages as the keyword extraction target message. If there is any response message corresponding to the reception message, the control unit 160 may determine the response message as the keyword extraction target message. The response message may be a message transmitted after the receipt of the reception message (e.g., message 322 in FIG. 3A) or the input message (e.g., message 330 in FIG. 3A). If there is any transmission message corresponding to the reception message, the control unit 160 may determine the transmission message as the keyword extraction target message.

In another example, the control unit 160 recognizes the context of the reception message (e.g., a most recent one of the reception messages) to determine whether the reception message is a query message or request message. If the reception message is a query message or a request message, the control unit may determine the reception message as the keyword extraction target message. However, if there is any response message (as aforementioned, transmission message or input message) to the reception message, the control unit 160 may determine the response message as the keyword extraction target message.

The control unit 160 extracts keywords from the messages determined as keyword extraction target message, at step 430. The control unit 160 determines whether an attach request event occurs, at step 440. If the attach request event occurs, the control unit 160 searches the database 131 for the data corresponding to the keywords at step 450. Here, the database may be an external database.

The control unit 160 controls the display unit 110 to display the found data or icons representing the found data at step 460. At this time, the control unit 160 may control the display unit 110 to display the keywords. The control unit 160 determines whether an event for selecting the found data occurs at step 470. If the data selection event occurs, the control unit 160 controls the radio communication unit 140 to transmit a second message including the selected data (i.e., the input message), at step 480.

Figure 5:
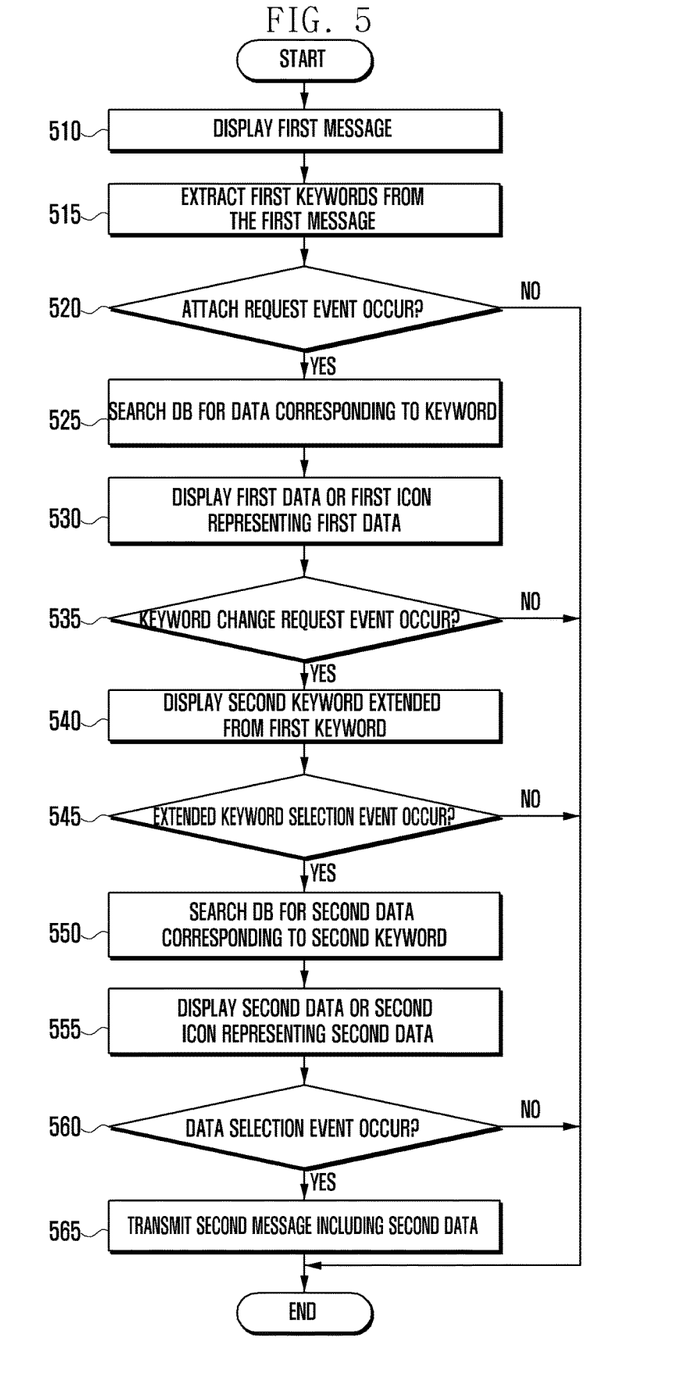
FIG. 5 is a flowchart illustrating the data provision method according to another embodiment of the present invention.
Figure 6A:
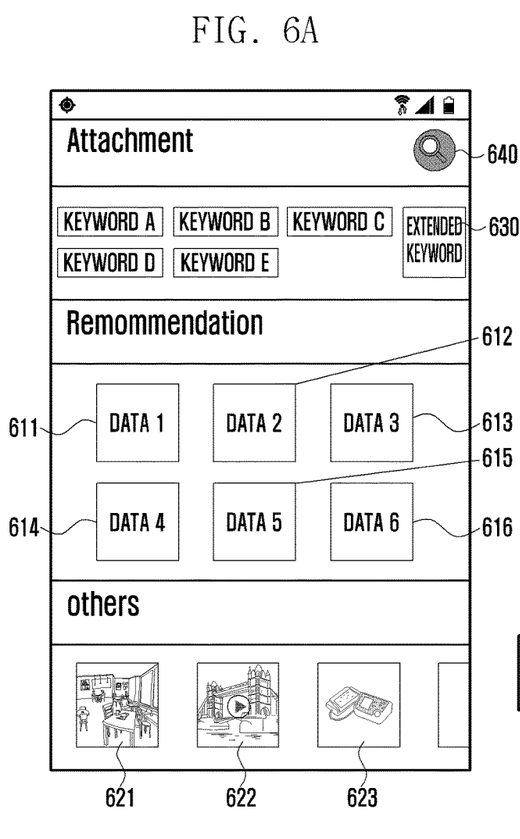
FIGS. 6A to 6C are diagrams illustrating examples of screens displayed in the procedure of the data provision method of FIG. 5.
Figure 6B:
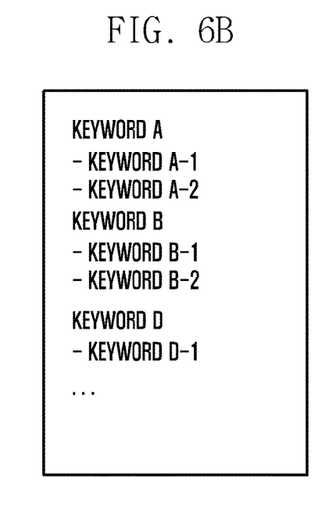
Figure 6C:
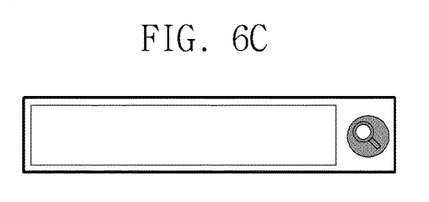

FIG. 5 is a flowchart illustrating a data provision method according to another embodiment of the present invention. FIGS. 6A to 6C are diagrams illustrating examples of screens displayed in the procedure of the data provision method of FIG. 5.

Referring to FIGS. 1, 5, and 6A to 6C, the display unit 110 displays at least one first message under a control of the control unit 160, at step 510.

The control unit 160 extracts first keywords from the first messages, at step 515.

The control unit 160 determines whether an attach request event occurs, at step 520. In response to a determination that the attach request event occurs, the control unit 160 searches the database 131 for the first data corresponding to the first keyword, at step 525. The database may include an external database.

The control unit 160 controls the display unit 110 to display the first data or a first icon representing the first data, at step 530. At this time, the control unit 160 controls the display unit 110 to display the first keyword. Referring to FIG. 6A, the display unit 110 displays the keywords (i.e., KEYWORD A to KEYWORD E) and icons 611 to 616 corresponding to the data (i.e., DATA 1 to DATA 6) retrieved based upon the keywords. The display unit 110 also displays icons 621 to 623, which are selectable by the user, in order for the user to retrieve and select data by data type (e.g., image, video, and contact), under the control of the control unit 160. The icons 621, 622, and 623 respectively correspond to the data types image, video, and contact. The display unit 110 also displays an icon 640, which is selectable by the user, in order for the user to input a keyword directly under the control of the control unit 160. If the icon 640 is selected, the control unit 160 controls the display unit 110 to display a keyword in a keyword entry box, as shown in FIG. 6C.

The control unit 160 determines whether a keyword change request event occurs, at step 535. In response to a determination that the keyword change request event occurs, the control unit 160 searches the keyword mapping table 132 for a second keyword extended from the first keyword and controls the display unit 110 to display the second keyword, at step 540. FIG. 6B illustrates examples of second keywords extending from different first keywords, such as KEYWORD A-1 and KEYWORD A-2 each extending from KEYWORD A. The keyword change request event may be a user gesture (e.g., a tap on icon 630) made on the touchscreen 111, may be a key event occurring at the key input unit 120, or may also be speech data. For example, the control unit 160 may receive speech data from the audio processing unit 150, convert the speech data to a text, and determine, if the text includes a certain keyword (e.g., 'keyword change') that the keyword change request event has occurred.

The control unit 160 determines whether an extended keyword selection event occurs, at step 545. In response to a determination that the extended keyword selection event occurs, the control unit 160 searches the database 131 for the second data corresponding to the selected second keyword at step 550. The extended keyword selection event may be a user gesture (e.g., a tap on "KEYWORD A-1" in FIG. 6B) made on the touchscreen 111. The extended keyword selection event may be a key event occurring at the key input unit 120. The extended keyword selection event also may be speech data (e.g., "keyword A-1").

The control unit 160 controls the display unit 110 to display the second data or a second icon representing the second data, at step 555. At this time, the control unit 160 may control the display unit 110 to display the selected second keyword instead of the first keyword.

The control unit 160 determines whether a data selection event for selecting the second data occurs, at step 560. In response to a determination that the data selection event occurs, the control unit 160 controls the radio communication unit 140 to transmit the second message including the second data (i.e., the input message), at step 565.

Figure 7:
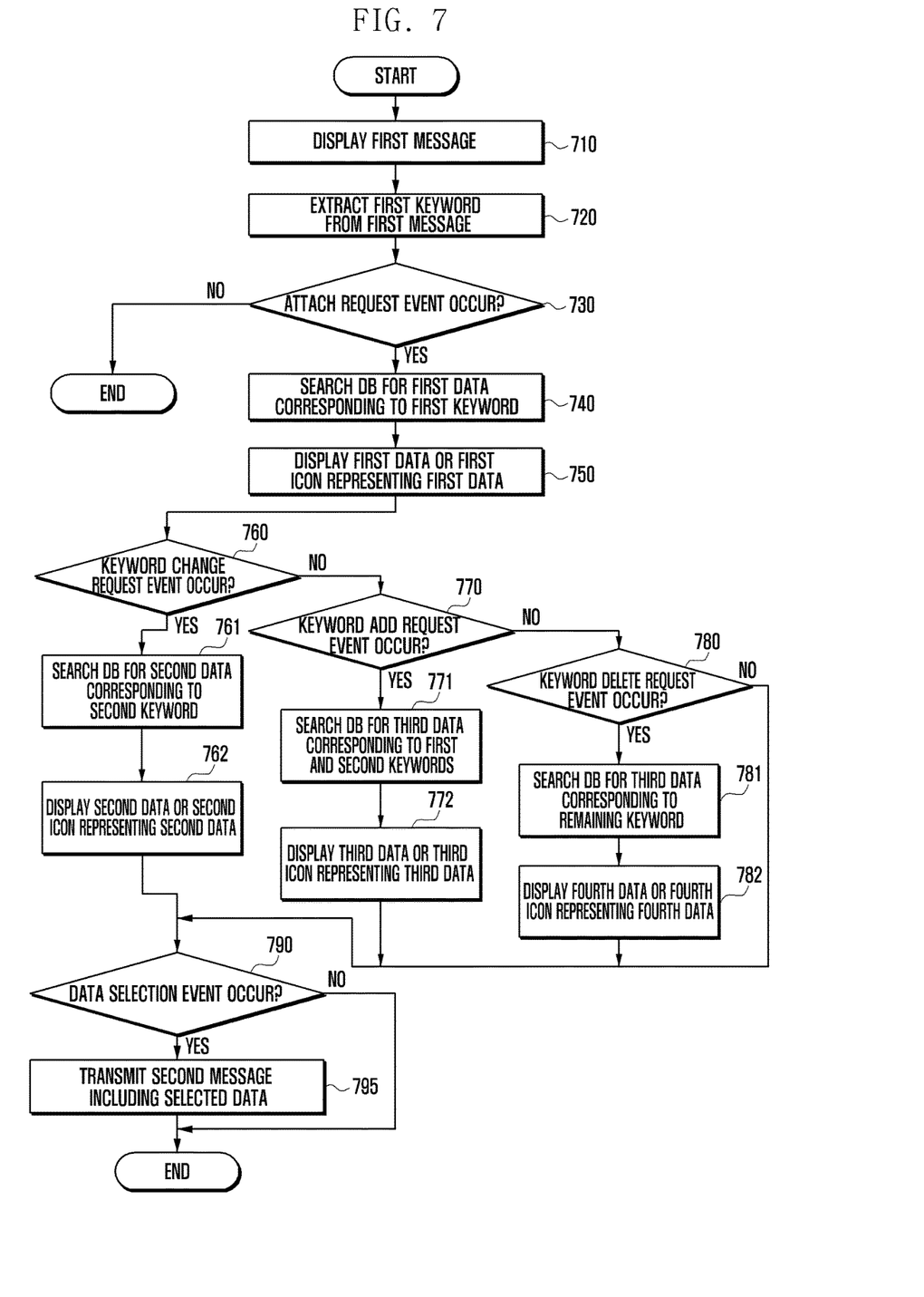
FIG. 7 is a flowchart illustrating a data provision method according to another embodiment of the present invention.

FIG. 7 is a flowchart illustrating a data provision method according to another embodiment of the present invention.

Referring to FIGS. 1 and 7, the display unit 110 displays at least one first message under the control of the control unit 160 at step 710.

The control unit 160 extracts the first keyword from the first message, at step 720.

The control unit 160 determines whether an attach request event occurs at step 730. In response to a determination that the attach request event occurs, the control unit 160 searches the database 131 for first data corresponding to the first keyword at step 740. The database may include an external database.

The control unit 160 controls the display unit 110 to display the first data or a first icon representing the first data at step 750. At this time, the control unit 160 may also control the display unit 110 to display the first keyword.

The control unit 160 determines whether a keyword change request event occurs at step 760. In response to a determination that the keyword change request event occurs, the control unit 160 changes the first keyword for a second keyword and searches the database 131 for second data corresponding to the second keyword, at step 761. The control unit 160 controls the display unit 110 to display the second data or a second icon representing the second data, at step 762. The keyword change request event may be a touch gesture (e.g., a tap on "KEYWORD A-1" in FIG. 6B or a tap on a 'change' button displayed on the display unit 110), a key event occurring at the key input unit 120, or a speech data (e.g., "change"). The second keyword may be a keyword selected by the user from an extended keyword list, input by the user using the key input unit 120, or input in the form of the user's speech.

The control unit 160 determines whether a keyword add request event occurs at step 770. In response to a determination that the keyword add request event occurs, the control unit 160 adds a third keyword and searches the database 131 for third data corresponding to the first and second keywords at step 771. The control unit 160 controls the display unit 110 to display the third data or a third icon representing the third data, at step 772. The keyword add request event may be a touch gesture (e.g., a flick on "KEYWORD A-1" in FIG. 6B or a tap on an 'add' button displayed on the display unit 110), a key event occurring at the key input unit 120, or a speech data (e.g., "add"). The third keyword may be a keyword selected by the user from an extended keyword list, such as shown in FIG. 6B, a keyword input by the user using the keypad displayed on the display unit 110 or the key input unit 120, or a keyword input in the form of the user's speech.

The control unit 160 determines whether a keyword delete request event occurs at step 780. In response to a determination that the keyword delete request event occurs, the control unit 160 deletes the first keyword and searches the database 131 for fourth data corresponding to the remaining keyword (e.g., keywords from KEYWORD B to KEYWORD E, while excluding KEYWORD A in FIG. 6A), at step 781. The control unit 160 controls the display unit 110 to display the fourth data or a fourth icon representing the fourth data, at step 782. The keyword delete request event may be a touch gesture (e.g., a long tap on "KEYWORD A" in FIG. 6A) or speech data (e.g., "delete keyword A").

The control unit 160 determines whether a data selection event occurs, at step 790. In response to a determination that the data selection event occurs, the control unit 160 controls the radio communication unit 140 to transmit a second message including the selected data (e.g., one of the first to fourth data), (i.e., the input message), at step 795.

Figure 8:
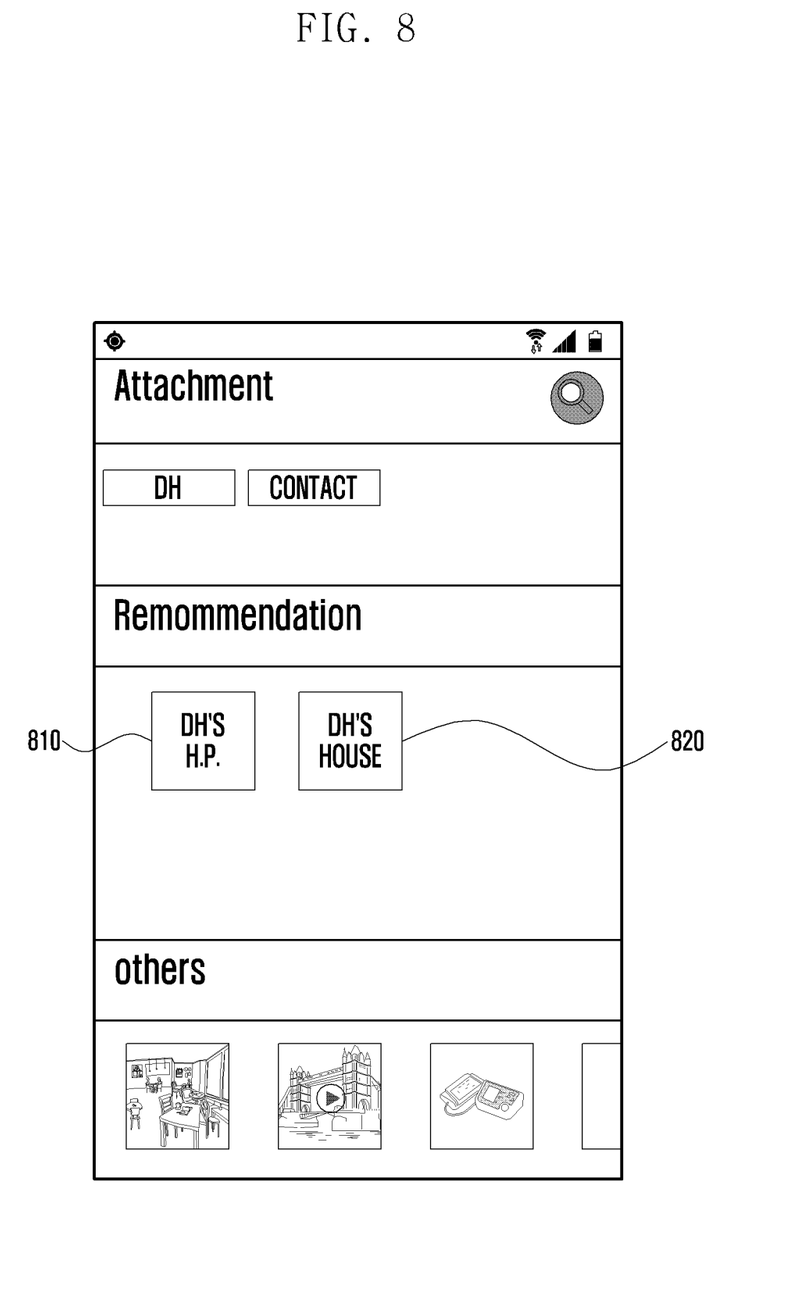
FIGS. 8 and 9 are diagrams illustrating examples of screens according to embodiments of the present invention.

With reference to FIG. 8, a contact search scenario according to an embodiment of the present invention is described as follows.

FIG. 8 is a diagram illustrating an example of screen a according to an embodiment of the present invention.

According to an embodiment of the present invention, a terminal operated by a user 'ES' is in a state in which the terminal displays a message from a user 'IH' stating, "please search for phone number of DH" while also displaying a message of the user ES stating, "yeah, for a while".

While the messages are displayed, ES' terminal extracts 'DH' and 'phone number' as keywords from the displayed messages. Next, the user ES pushes an 'attach' button, in order to request the terminal to notify IH of contact information of 'DH'.

In response to the push of the 'attach' button, ES' terminal searches contact information for a cellular phone number and a home phone number of DH.

Based upon results of the search, ES' terminal displays, as shown in FIG. 8, a first icon 810 corresponding to a cellular phone number of DH and a second icon 820 corresponding to a home phone number of DH.

After the icons as shown in FIG. 8, are displayed, when user ES selects the first icon 810, ES' terminal ES sends, to a terminal of user IH, a message that includes cellular phone number of DH.

Figure 9:
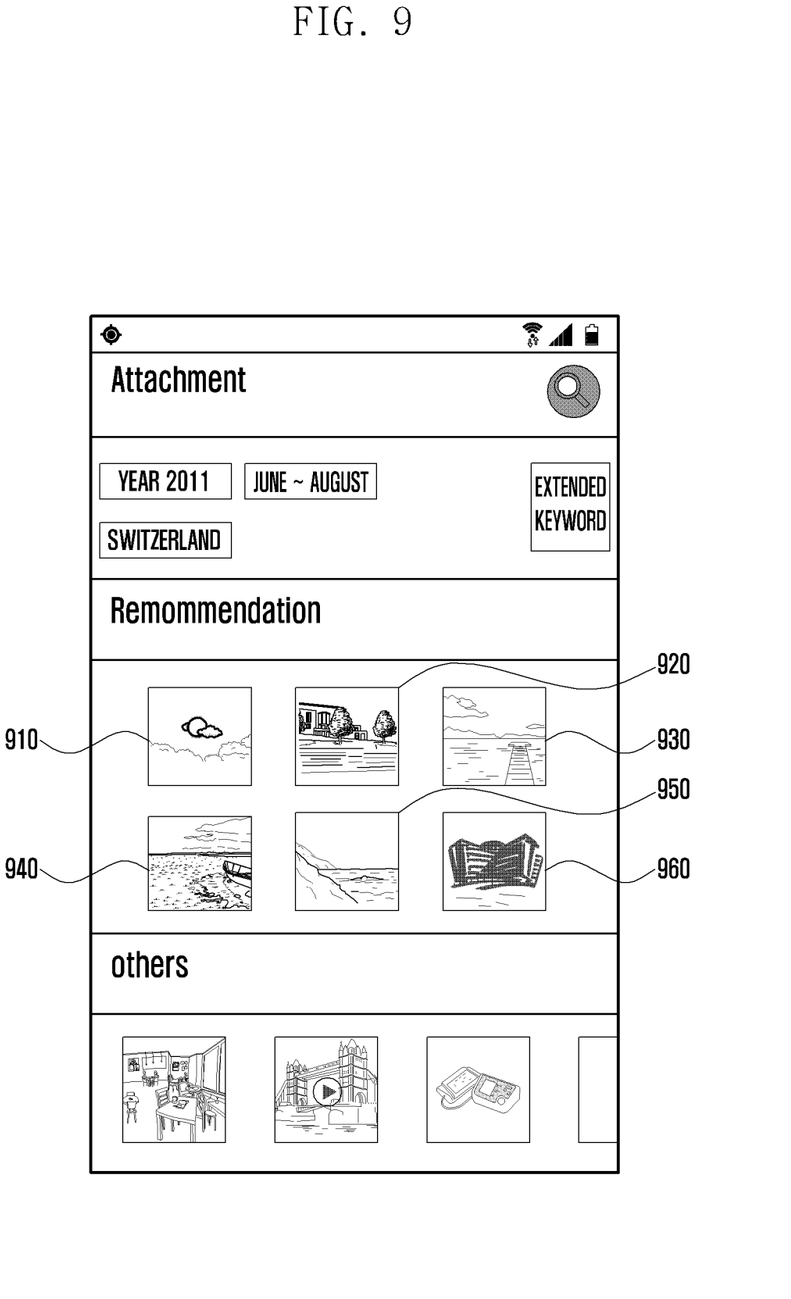

With reference to FIG. 9, a travel photo sharing scenario according to an embodiment of the present invention is described as follows.

FIG. 9 is a diagram illustrating an example of a screen according to another embodiment of the present invention.

According to an embodiment of the present invention, a terminal operated by a user 'ES' is in a state in which the terminal displays a message from a user 'IH' stating, "How about the last summer travel? Is it recommendable for me to go there this time." while also displaying a message of the user ES stating, "Switzerland? That was good. I will send a few photos." ES' terminal extracts, from the displayed messages, 'last year', 'summer', 'Switzerland', and 'photo' as keywords.

Next, the user ES pushes an 'add' button in order to request the terminal to transmit photos shot in Switzerland last year.

In response to the push of the 'add' button, ES' terminal searches the photo gallery for photos corresponding to last summer (e.g., June to August, 2011) and Switzerland.

Based upon the results of the search, ES' terminal displays the icons 910 to 960 of found photos, as shown in FIG. 9. When the user ES selects one of the displayed icons 910 to 960, ES' terminal sends, to a terminal of user IH, a message including photos corresponding to the selected icons.

Mobile terminals and data provision methods thereof according to embodiments of the present invention is capable allow a user to retrieve the data to be attached to a transmission message.

The above-described data provision methods according to embodiments of the present invention can be implemented in the form of computer-executable program commands and stored in a computer-readable storage medium. The computer readable storage medium may store the program commands, data files, and data structures individually or combined forms. The program commands recorded in the storage medium may be designed and implemented for various embodiments of the present invention. Computer-readable storage mediums in accordance with embodiments of the present invention include, for example, magnetic media such as a floppy disk and a magnetic tape, optical media including a Compact Disc (CD) Read-Only Memory (ROM) and a Digital Video Disc (DVD) ROM, a magneto-optical media such as a floptical disk, and the hardware device designed for storing and executing program commands such as ROM, Random Access Memory (RAM), and flash memory. The programs commands include the language code executable by computers using the interpreter as well as the machine language codes created by a compiler. The aforementioned hardware devices can be implemented with one or more software modules for executing the operations of various embodiments of the present invention.

While the present invention has been shown and described with reference to certain embodiments and drawings thereof, it will be understood by those skilled in the art that various changes in form and details may be made therein without departing from the spirit and scope of the invention as defined by the appended claims and their equivalents.

What is claimed is:

1. A data provision method of a mobile terminal capable of transmitting and receiving messages, the method comprising:
    displaying at least one first message;
    extracting at least one first keyword from the first message;
    determining whether an attach request event occurs;
    searching, when the attach request event occurs, a database for a first data corresponding to the extracted at least one first keyword;
    displaying, according to a result of the search, at least one of the first data and a first icon representing the first data;
    searching a keyword mapping table for at least one second keyword related to the at least one first keyword, the at least one second keyword being related to at least one of a transmission time, reception time, and sender of the first message, and being related to information of the first keyword which is at least one of location, time and people;
    searching the database for a second data corresponding to the at least one second keyword;
    displaying at least one of the second data and a second icon representing the second data together with the at least one of the first data and the first icon representing the first data; and
    transmitting a second message including one of the first data and the second data selected by a user.

2. The method of claim 1, wherein extracting the at least one first keyword comprises:
    determining, when the at least one first message includes a plurality first messages, at least one of the first messages as at least one keyword extraction target message; and
    extracting the at least one first keyword from the at least one keyword extraction target message.

3. The method of claim 2, wherein determining at least one of the first messages as the at least one keyword extraction target message comprises selecting most a recently received message from among at least one reception message received by the mobile terminal as one of the at least one keyword extraction target message.

4. The method of claim 3, wherein determining at least one of the first messages as the at least one keyword extraction target message comprises selecting a response message to the reception message determined as the keyword extraction target message as another one of the at least one keyword extraction target message.

5. The method of claim 2, wherein determining at least one of the first messages as the at least one keyword extraction target message comprises:
    determining whether a most recently received message is either one of a query message and a request message; and
    selecting, when the most recently received message is determined to be either one of the query message and the request message, the most recently received message as one of the at least one keyword extraction target message.

6. The method of claim 3, wherein determining at least one of the first messages as the at least one keyword extraction target message comprises selecting, as another one of the at least one keyword extraction target message, a response message to the reception message determined as one of the at least one keyword extraction target message.

7. The method of claim 1, further comprising displaying the extracted at least one first keyword.

8. The method of claim 1, further comprising:
    displaying the at least one second keyword.

9. The method of claim 1, further comprising:
    changing, in response to a keyword change request event, a keyword to be used for a search from the at least one first keyword to the at least one second keyword.

10. The method of claim 1, further comprising:
    adding the at least one second keyword in response to a keyword add request event;
    searching the database for a third data corresponding to the at least one first keyword and at least one second keyword; and
    displaying at least one of the third data and a third icon representing the third data.

11. The method of claim 1, further comprising:
    deleting at least one of the at least one first keyword in response to a keyword delete request event;

searching the database for a fourth data corresponding to keywords from among at least one first keyword remaining after deleting at least one of the at least one first keyword; and displaying at least one of the fourth data and a fourth icon representing the fourth data.

12. A mobile terminal capable of transmitting and receiving messages, the terminal comprising:
a radio communication unit that transmits and receives the messages;
a display unit that displays the messages;
an input unit that receives input of a message; and
a control unit that controls the input unit, the display unit, and the radio communication unit,
wherein the control unit extracts at least one first keyword from at least one first message displayed on the display unit, searches, when the attach request event occurs, a database for a first data corresponding to the extracted at least one first keyword, controls displaying, according to a result of the search, at least one of the first data and a first icon representing the first data, and
wherein the control unit searches a keyword mapping table for at least one second keyword related to the at least one first keyword, searches the database for a second data corresponding to the at least one second keyword, controls displaying at least one of the second data and a second icon representing the second data together with the at least one of the first data and the first icon representing the first data, and controls transmitting a second message including one of the first data and the second data selected by a user, and wherein the at least one second keyword is related to at least one of a transmission time, reception time, and sender of the first message, and being related to information of the first keyword which is at least one of location, time and people.

13. The terminal of claim 12, wherein the control unit determines, when the at least one first message includes a plurality of first messages, at least one of the first messages as at least one keyword extraction target message and extracts the at least one first keyword from the at least one keyword extraction target message.

14. The terminal of claim 12, wherein the control unit controls display of the first keyword.

15. The terminal of claim 12, wherein the input unit comprises at least one of a touchscreen, a key input unit, and a microphone.

16. The terminal of claim 12, further comprising a storage unit including the database and the keyword mapping table.

17. The terminal of claim 12, wherein the database is located outside of the terminal, and the control unit controls the radio communication unit to search the database for data.

* * * * *